United States Patent
Ayres

(10) Patent No.: US 7,426,209 B2
(45) Date of Patent: Sep. 16, 2008

(54) SYSTEM FOR CONTENT BASED MESSAGE PROCESSING

(75) Inventor: Lawrence Ayres, Santa Barbara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1184 days.

(21) Appl. No.: 10/318,742

(22) Filed: Dec. 13, 2002

(65) Prior Publication Data

US 2004/0120325 A1 Jun. 24, 2004

(51) Int. Cl.
H04L 12/28 (2006.01)
H04L 12/56 (2006.01)

(52) U.S. Cl. .................... 370/395.4; 370/412

(58) Field of Classification Search ............. 345/637; 370/395.4, 395.41, 395.42, 412, 447, 455, 370/395.52; 379/161; 455/166.2, 435.3, 455/512, 527; 709/207; 710/111; 715/807
See application file for complete search history.

(56) References Cited

U.S. PATENT DOCUMENTS

| | | | | |
|---|---|---|---|---|
| 5,506,966 | A * | 4/1996 | Ban ............................ | 719/314 |
| 6,003,101 | A * | 12/1999 | Williams ..................... | 710/112 |
| 6,185,221 | B1 | 2/2001 | Aybay | |
| 6,188,698 | B1 | 2/2001 | Galand et al. | |
| 6,798,789 | B1 * | 9/2004 | Jackson et al. ............... | 370/489 |
| 7,042,888 | B2 * | 5/2006 | Berggreen .................... | 370/401 |
| 7,058,051 | B2 * | 6/2006 | Tsuruoka et al. ............. | 370/388 |
| 7,088,739 | B2 * | 8/2006 | DeMars et al. ............... | 370/476 |
| 7,095,740 | B1 * | 8/2006 | Jagannath et al. ........... | 370/392 |
| 7,151,747 | B2 * | 12/2006 | Isoyama ...................... | 370/235 |
| 7,170,900 | B2 * | 1/2007 | Berggreen .................... | 370/412 |
| 2002/0019853 | A1 | 2/2002 | Vange et al. | |
| 2002/0044557 | A1 * | 4/2002 | Isoyama ................. | 370/395.42 |
| 2002/0097675 | A1 * | 7/2002 | Fowler et al. ................ | 370/230 |
| 2003/0123386 | A1 * | 7/2003 | Yang ........................... | 370/229 |
| 2004/0100906 | A1 * | 5/2004 | Gay ............................. | 370/235 |
| 2007/0081456 | A1 * | 4/2007 | Gorti et al. ................... | 370/229 |

* cited by examiner

Primary Examiner—Hong Sol Cho
(74) Attorney, Agent, or Firm—Michael Cameron

(57) ABSTRACT

The present invention provides a packet (400, 410 or 420) having a message (404) and a processing priority (402) associated with the message (404). The processing priority (402) is dynamically changeable by a function operating on the message (404). The present invention also provides a method for associating a processing priority (402) to a message (404) by receiving the message (504), determining the processing priority for the message (506) and associating the processing priority with the message such that the processing priority is dynamically changeable by a function operating on the message (508). In addition, the present invention provides a method for scheduling messages by receiving one or more messages (904) and storing each message in a multidimensional processing queue based on a processing priority and an attribute associated with the message (906). Each queued message from the multidimensional processing queue is scheduled for processing based on an algorithm (908).

5 Claims, 6 Drawing Sheets

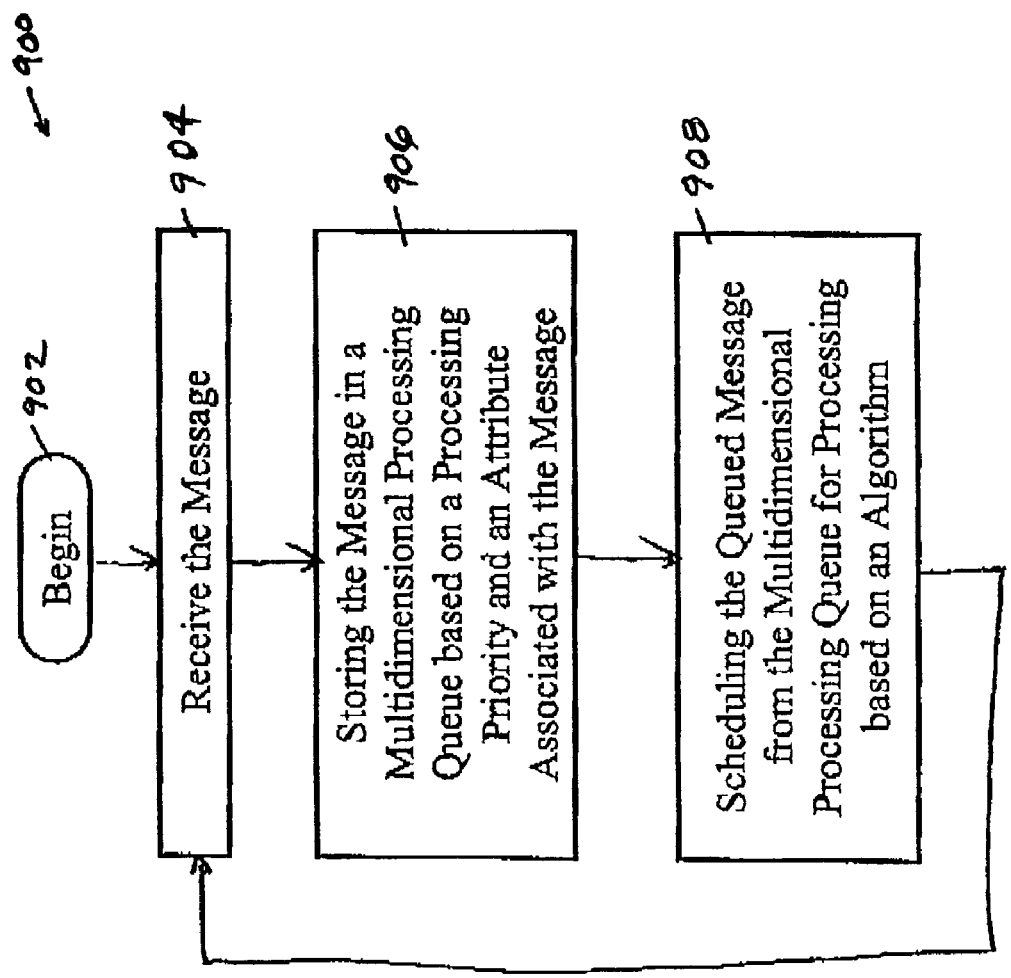

SYSTEM FOR CONTENT BASED MESSAGE PROCESSING

FIELD OF THE INVENTION

The present invention relates generally to the field of communications and, more particularly, to a method and apparatus for content based message processing.

BACKGROUND OF THE INVENTION

The increasing demand for data communications has fostered the development of techniques that provide more cost-effective and efficient means of using communication networks to handle more information and new types of information. One such technique is to segment the information, which may be a voice or data communication, into packets. A packet is typically a group of binary digits, including at least data and control information. Integrated packet networks (typically fast packet networks) are generally used to carry at least two (2) classes of traffic, which may include, for example, continuous bit-rate ("CBR"), speech ("Packet Voice"), data ("Framed Data"), image, and so forth. Packet networks source, sink and/or forward protocol packets.

Congestion and Quality of Service ("QoS") problems inside these networks have not been solved satisfactorily and remain as outstanding issues to be resolved. Although, message scheduling helps alleviate these problems, the efficient scheduling of work with thousands of entities (instances) is not a simple matter. At present, most message scheduling is based on the simplest technique for queuing packets for transmission on an internodal trunk of a fast-packet network: a first-in-first-out ("FIFO") queue. However, FIFO queuing techniques do not address QoS parameters. This technique can also allow overload periods for digitized speech packets and for Framed Data packets, which results in a greater share of bandwidth being provided to one at the expense of the other; an undesirable result.

Another technique, head-of-line-priority ("HOLP"), may give data priority over speech, but does not solve the problem of data and speech queues affecting the QoS of each other and of CBR data fast packets under high traffic conditions. In HOLP, where speech fast packets are given a high priority, speech fast packets may affect the QoS of lower priority queues. Likewise, queuing schemes designed only for data do not solve the problems of integrating other traffic types, such as speech and CBR data.

Traditional packet data routers are constructed in software using a scheduler or Real Time Operating System ("RTOS"), which associates the processing priority of functions (protocols or other operations performed upon a packet including forwarding) with the task or process that the function operates under. Thus, a particular function has a priority and all packets processed by the function inherit that priority for the duration of their processing by the function. If the next processing step to which the packet is subjected is set at a different priority, then the packet inherits a different priority for the duration of this processing step. Priority is associated with the function applied to the packet rather than the packet itself. If all packets traverse the same set of functions, they have equal access to the central processing unit ("CPU") and receive equal priority treatment.

If all packets had equal priority, this might be sufficient. However, due to the need to sell different QoS, and the needs resulting from multimedia (voice, video and data) carried upon the same network infrastructure, there is a need to assign different priorities to a packet, and vary resource allocation (especially processing time) and forwarding treatment on a per-packet basis.

SUMMARY OF THE INVENTION

The present invention provides a system for assigning different priorities to a packet, and varying resource allocation (especially processing time) and forwarding treatment on a per-packet basis. The present invention is adaptable to accommodate new message types, multimedia applications and multi-service applications. It is flexible, with the ability to cater to a wide range of configurations and environments and improves the QoS of VoIP calls.

The present invention provides a packet having a message and a processing priority associated with the message. The processing priority is dynamically changeable by a function operating on the message. The processing priority can be associated with the message by attaching the processing priority to the start of the message, appending the processing priority to the end of the message or linking the processing priority to the message using pointers. The system for associating a processing priority to a message involves receiving the message, determining the processing priority for the message and associating the processing priority with the message such that the processing priority is dynamically changeable by a function operating on the message. This process can be implemented using a computer program embodied on a computer readable medium wherein each step is performed using one or more code segments.

The present invention also provides a method for scheduling one or more messages. The one or more messages are received and then each message is stored in a multidimensional processing queue based on a processing priority and an attribute associated with the message. Each queued message from the multidimensional processing queue is scheduled for processing based on an algorithm. The attribute can be a virtual private network classification, destination software function, function index, a functionality type or other message attribute. The algorithm can be one or more algorithms, such as an exponentially weighted, non-starving, nested-round-robin, message-priority-based scheme or a weighted, non-starving, nested-round-robin, class-based scheme. This process can be implemented using a computer program embodied on a computer readable medium wherein each step is performed using one or more code segments.

In addition, the present invention provides a communications switch having one or more ingress cards, one or more signal processing cards, one or more control cards containing one or more processors and one or more egress cards. Each signal-processing card contains an array of digital signal processors. The switch also includes a switch fabric communicably coupling the ingress cards, the signal processing cards, the control cards and the egress cards, a TDM bus communicably coupling the ingress cards, the signal processing cards, the control cards and the egress cards, a multidimensional processing queue, and a scheduler communicably coupled to each processor and the multidimensional processing queue. The scheduler receives one or more messages, stores each message in the multidimensional processing queue based on a priority and an attribute of the message, and schedules each queued message from the multidimensional processing queue for processing based on an algorithm.

BRIEF DESCRIPTION OF THE DRAWINGS

The above and further advantages of the invention may be better understood by referring to the following description in conjunction with the accompanying drawings, in which:

FIG. 9 is a flowchart illustrating a method for scheduling messages into queues in accordance with one embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates to communications systems, and more particularly, to processing messages within a communications switch. It will be understood that, although the description herein refers to a communications environment, the concepts of the present invention are applicable to other environments, such as general data processing.

The present invention provides a system for assigning different priorities to a packet, and vary resource allocation (especially processing time) and forwarding treatment on a per-packet basis. The present invention is adaptable to accommodate new message types, multimedia applications and multi-service applications. It is flexible, with the ability to cater to a wide range of configurations and environments and improves the QoS of VoIP calls.

Figure 1:
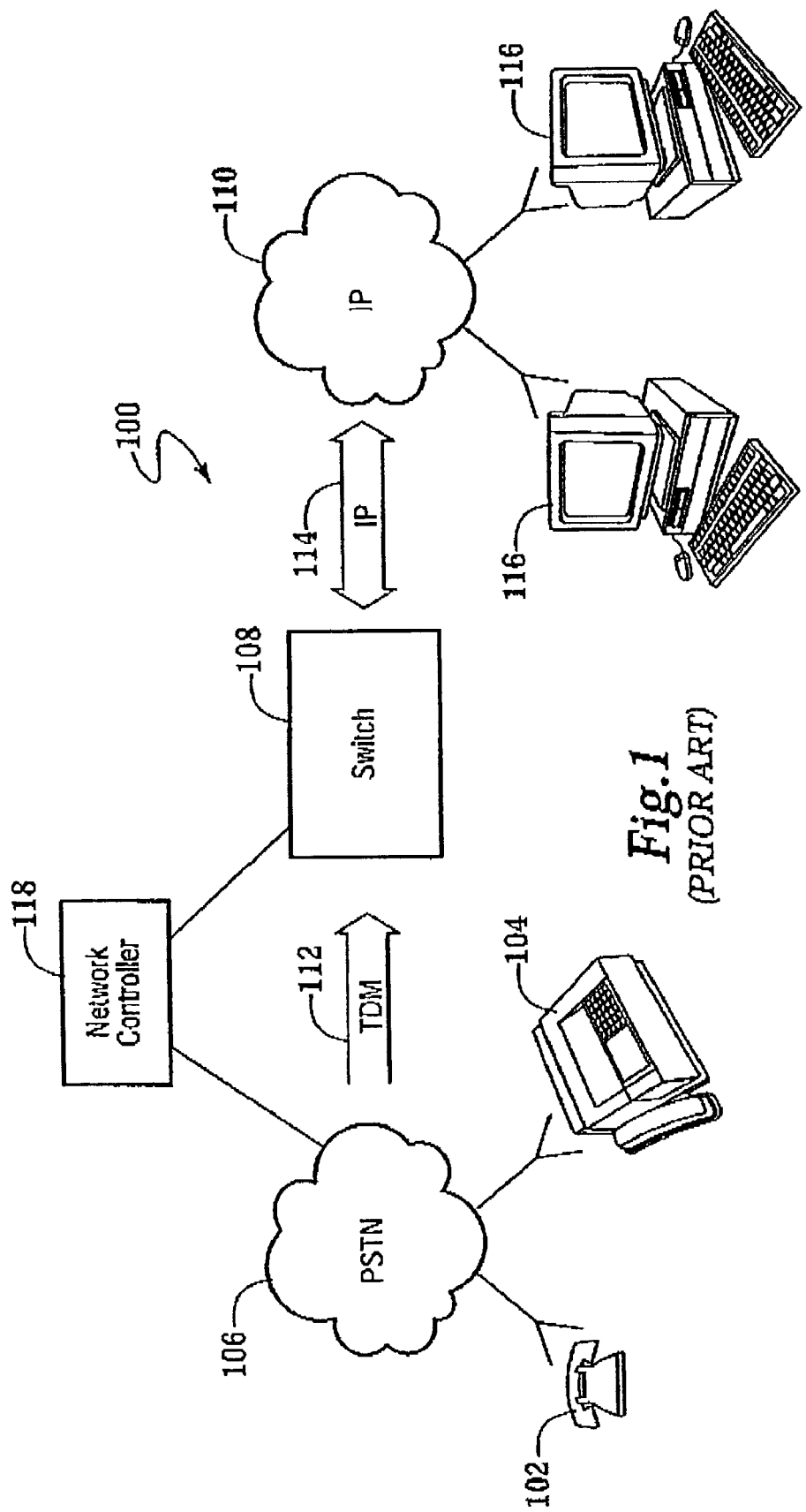
FIG. 1 is a block diagram of a representative integrated network in accordance with the PRIOR ART.

Now briefly referring to FIGS. 1-3, a representative network (FIG. 1) and various message scheduling systems (FIGS. 2 and 3) will be described in accordance with the prior art. FIG. 1 depicts a representative integrated network 100 in which phones 102 and faxes 104 are communicably coupled to a public switched telephone network ("PSTN") 106. A switch 108 is communicably coupled to the PSTN 106 and an Internet Protocol ("IP") network 110 to convert time division multiplexing ("TDM") based communications 112 to IP-based communications 114. The switch 108 creates IP packets containing the necessary destination information so that the packets 114 can be properly routed to their destinations, which may include computers 116 or other devices communicably coupled to the IP network 110. A network controller 118 is communicably coupled to the PSTN 106 and the switch 108, and provides control signals to the switch 108 for proper processing of the TDM based communications 112. The network controller 118 may also be communicably connected to the IP network 110. Network controller 118 can function as a Media Gateway Control ("MGC"). The MGC protocol is one of a few proposed control and signal standards to compete with the older H.323 standard for the conversion of audio signals carried on telephone circuits, such as PSTN 106 to data packets carried over the Internet or other packet networks, such as IP network 110. As will be appreciated by those skilled in the art, this example is not limited to the conversion of TDM based communications to IP-based communications; instead, the present invention may be applied to any conversion of a multiplexed communication to a packet-based communication.

IP specifies the format of packets, also called datagrams, and the addressing scheme. Most networks combine IP with a higher-level protocol called Transport Control Protocol ("TCP"), which establishes a virtual connection between a destination and a source. IP allows a packet to be addressed and dropped in a system, but there is no direct link between the sender and the recipient. TCP/IP, on the other hand, establishes a connection between two hosts so that they can send messages back and forth for a period of time. IP network 110 receives and sends messages through switch 108, ultimately to phone 102 and/or fax 104. PCs 116 receive and send messages through IP network 110 in a packet-compatible format. Voice over IP ("VoIP") is the ability to make telephone calls and send faxes over IP-based data networks, such as IP network 110. An integrated voice/data network 100 allows more standardization and reduces total equipment needs. VoIP can support multimedia and multi-service applications.

Figure 2:
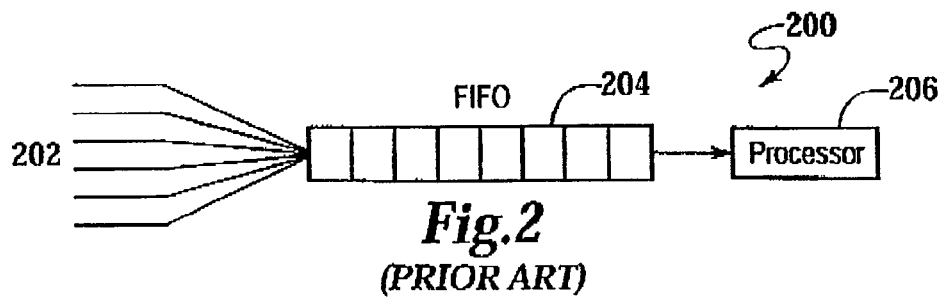
FIG. 2 is a schematic diagram illustrating a message scheduling system in accordance with the PRIOR ART.
Figure 3:
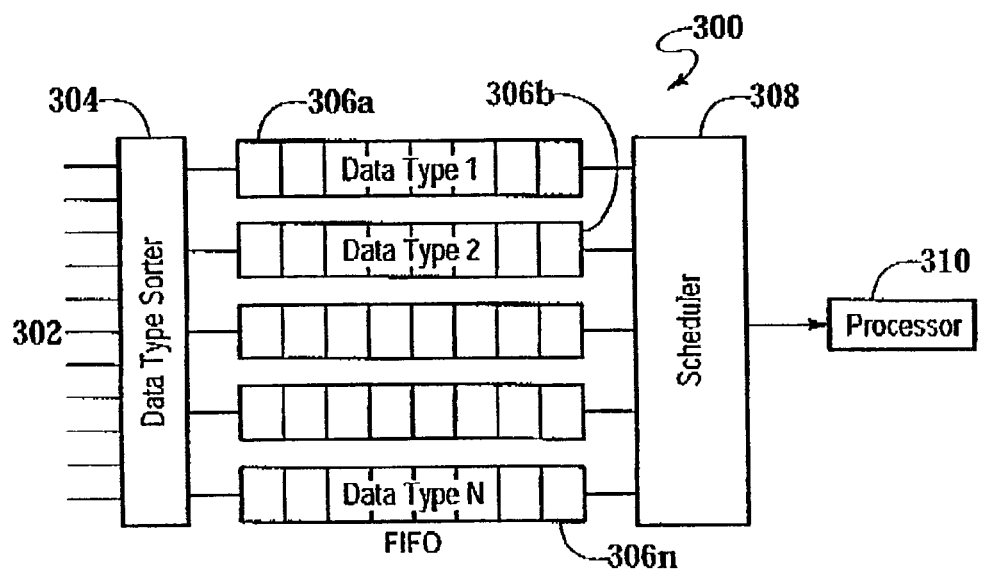
FIG. 3 is a schematic diagram illustrating another message scheduling system in accordance with the PRIOR ART.

FIGS. 2 and 3 are schematic diagrams illustrating two message scheduling systems 200 and 300 in accordance with the prior art. In FIG. 2, messages 202 are received and stored in first-in-first-out ("FIFO") queue 204. Messages 202 are then sent to processor 206 in the order in which they were received. No processing prioritization other than arrival time is applied in queue 204 is applied. In FIG. 3, messages 302 enter data type sorter 304 where messages 302 are separated by data type. A FIFO queue 306a, 306b, . . . 306n exists for each individual data type. Data type sorter 304 sends messages 302 to FIFO queues 306a, 306b, . . . 306n based on matching data types. Scheduler 308 then pulls messages 302 from FIFO queues 306a, 306, . . . 306n and sends messages 302 to processor 310. The primary prioritization is again based on arrival time in queues 306a, 306b, . . . 306n. Scheduler 308 only coordinates the pulling of messages 302 for processing.

Figure 4A:
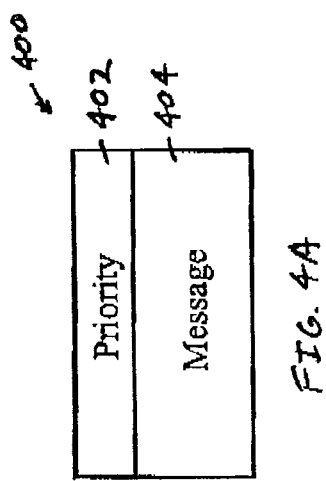
FIGS. 4A, 4B and 4C are block diagrams illustrating a packet having an associated processing priority in accordance with various embodiments of the present invention.
Figure 4B:
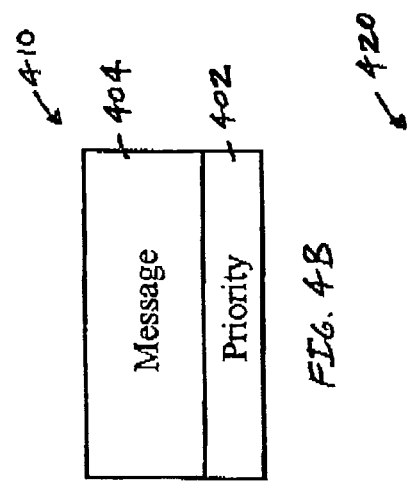
Figure 4C:
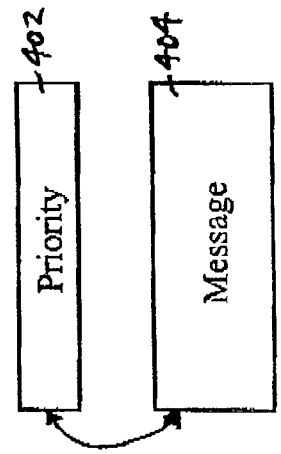

Now referring to the present invention and to FIGS. 4A, 4B and 4C, block diagrams illustrating a packet 400, 410 and 420 having an associated processing priority 402 in accordance with various embodiments of the present invention are shown. The present invention associates a processing priority or priority criteria 402 within or attached to a packet or message 404 in such a way that that the priority or priority criteria 402 traverses the system along with the packet or message 404. The priority or priority criteria 402 may be one or more parameters that are evaluated to produce a priority for the message 404. Moreover, the priority or priority criteria 402 may be modified dynamically during the traversal as decisions are made regarding the priority/criteria 402.

The priority/priority criteria 402 are associated with the packet/message 404 in such a way that reference to one allows reference to the other, they traverse the system together, and that functions operating upon the packet/message 404 have the ability to change the priority/priority criteria 402. Changing the priority/priority criteria 402 dynamically, when used in conjunction with the other aspects of this invention, creates a processing environment where the priority/priority criteria 402 of the message/packet 404 governs the work allocation or dispatching.

Since system hardware and software for carrying messages around a system vary, the present invention provides at least three ways to associate the priority or parameters that may be evaluated to produce a priority 402 to a message 404. The priority/priority criteria 402 may be attached to the start of the message 404 (FIG. 4A), appended to the end of the message 404 (FIG. 4B) or linked to the message 404 (FIG. 4C). With respect to FIG. 4C, the message header and the message itself are stored in non-adjacent memory locations, and linked together by a memory pointer or some other means which enables a reference to one portion to be used to locate and reference the other portion.

Figure 5:
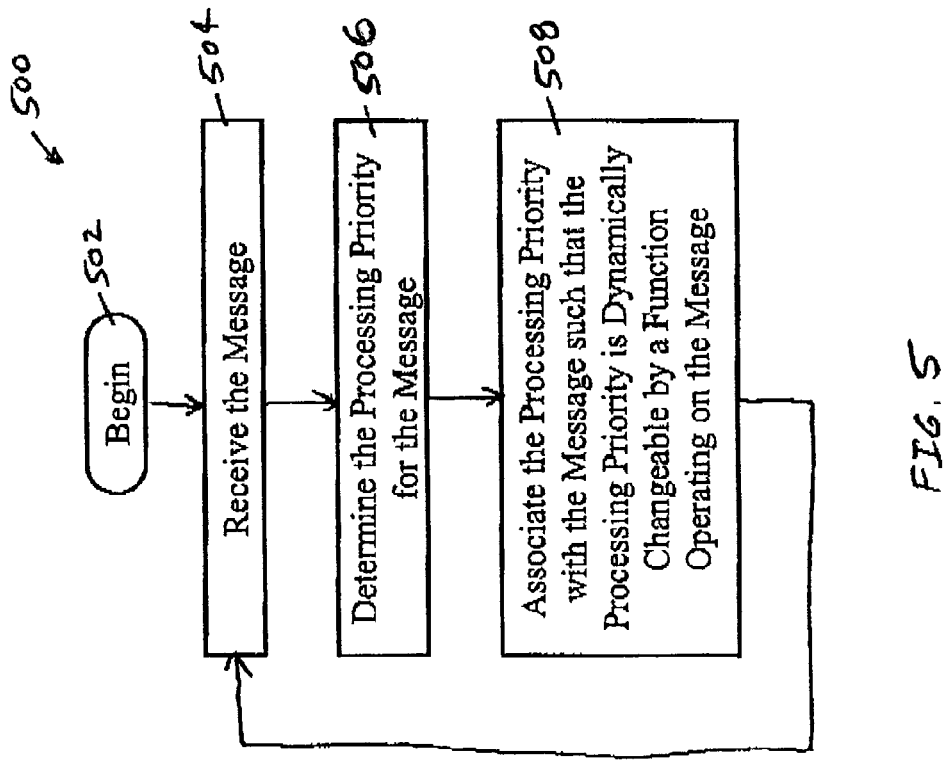
FIG. 5 is a flowchart illustrating a method for associating a priority with a message in accordance with one embodiment of the present invention.

Referring now to FIG. 5, a flowchart illustrating a method 500 for associating a priority with a message in accordance with one embodiment of the present invention is shown. The process begins in block 502 and a message is received in block 504. The processing priority for the message is determined in block 506. The processing priority is then associated with the message such that the processing priority is dynamically changeable by a function operating on the message in block 508. The process 500 then repeats for each newly received message. Note that this method 500 can be implemented as a computer program embodied on a computer readable medium wherein each block is performed by one or more code segments.

Figure 6:
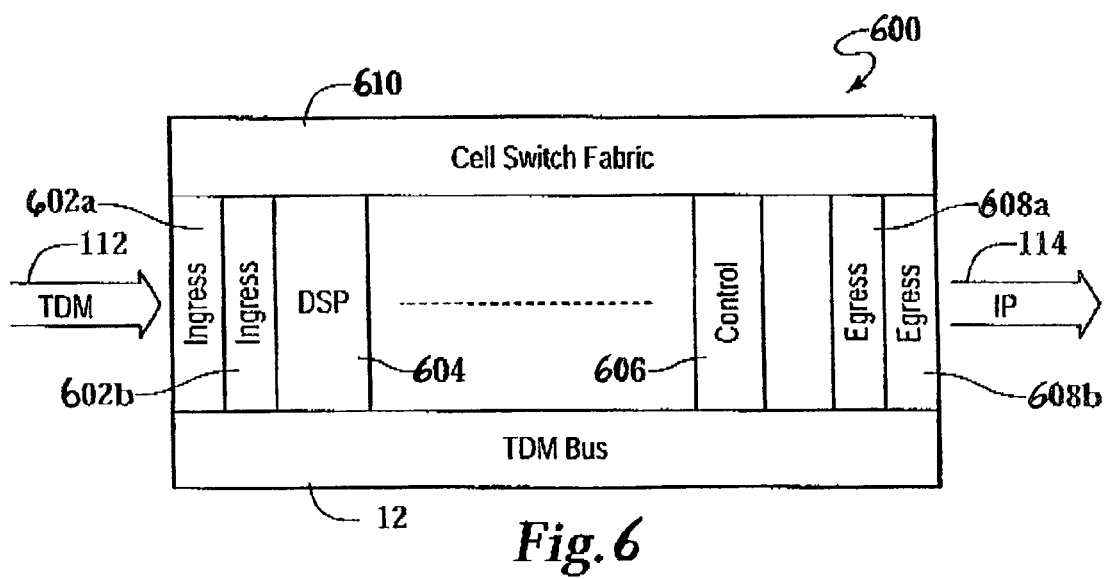
FIG. 6 is a diagram of a packet network switch in accordance with the present invention.

Now referring to FIG. 6, a packet network switch 600 will now be described. The packet network switch 600 can be used to process VoIP, voice over Frame Relay ("VoFR") and other types of calls. Moreover, the packet network switch 600 is similar to an asynchronous transfer mode ("ATM") switch. ATM is a connection-oriented technology used in both local area network ("LAN") and wide area network ("WAN") environments. It is a fast-packet switching technology that allows free allocation of capacity to each channel. Packet network switch 600 includes one or more ingress cards 602a and 602b, one or more signal processing cards 604, one or more control cards 606, one or more egress cards 608a and 608b, a switch fabric 610 and a TDM bus 612. Each signal processing card 604 contains an array of digital signal processors ("DSP") (not shown) and each control card 606 contains one or more processors (not shown). The switch fabric 610 communicably couples the ingress cards 602, the signal processing cards 604, the control cards 606 and the egress cards 608 together. The TDM bus 612 also communicably couples the ingress cards 602, the signal processing cards 604, the control cards 606 and the egress cards 608 together. Preferably cards 602, 604, 606 and 608 can be inserted in any order within packet network switch 600. Moreover, the packet network switch 600 should include sufficient numbers of redundant cards to serve as backup cards in the event a card 602, 604, 606 and 608 fails.

The main function of a packet network switch 600 is to relay user data cells from input ports to the appropriate output ports. When a call or communication is to be handled by the packet network switch 600, a network controller 118 (FIG. 1) provides the control card 608 with the necessary call setup information. Control card 608 uses this call setup information to assign a port in ingress cards 602a or 602b to receive the call from the PSTN 106 (FIG. 1), a DSP within processing card 604 to process the call, and a port in egress cards 608a or 608b to send the call to IP network 110 (FIG. 1). The TDM-based communications or messages 112 enter through ingress cards 602a or 602b and are routed to the appropriate processing card 604 through TDM Bus 612. The DSPs in processing card 604 convert messages between analog and digital information formats, and provide digital compression and switching functions. In one embodiment, each processing card 604 is capable of processing 1024 simultaneous sessions. The processing card 604 then sends the messages from the DSP to cell switch fabric 610, which is primarily responsible for the routing and transferring of messages or data cells, the basic transmission unit, between switch elements. The switch fabric 610 may also provide cell buffering, traffic concentration and multiplexing, redundancy for fault tolerance, multicasting or broadcasting, and cell scheduling based on delay priorities and congestion monitoring. Switch fabric 610 ultimately routes the messages to egress cards 608a or 608b. In one embodiment, each egress card 608 is capable of handling at least 8000 calls. Egress cards 608a and 608b typically send the messages to a gigabit Ethernet (not shown). As its name indicates, the gigabit Ethernet supports data rates of one (1) gigabit (1,000 megabits) per second.

Figure 7:
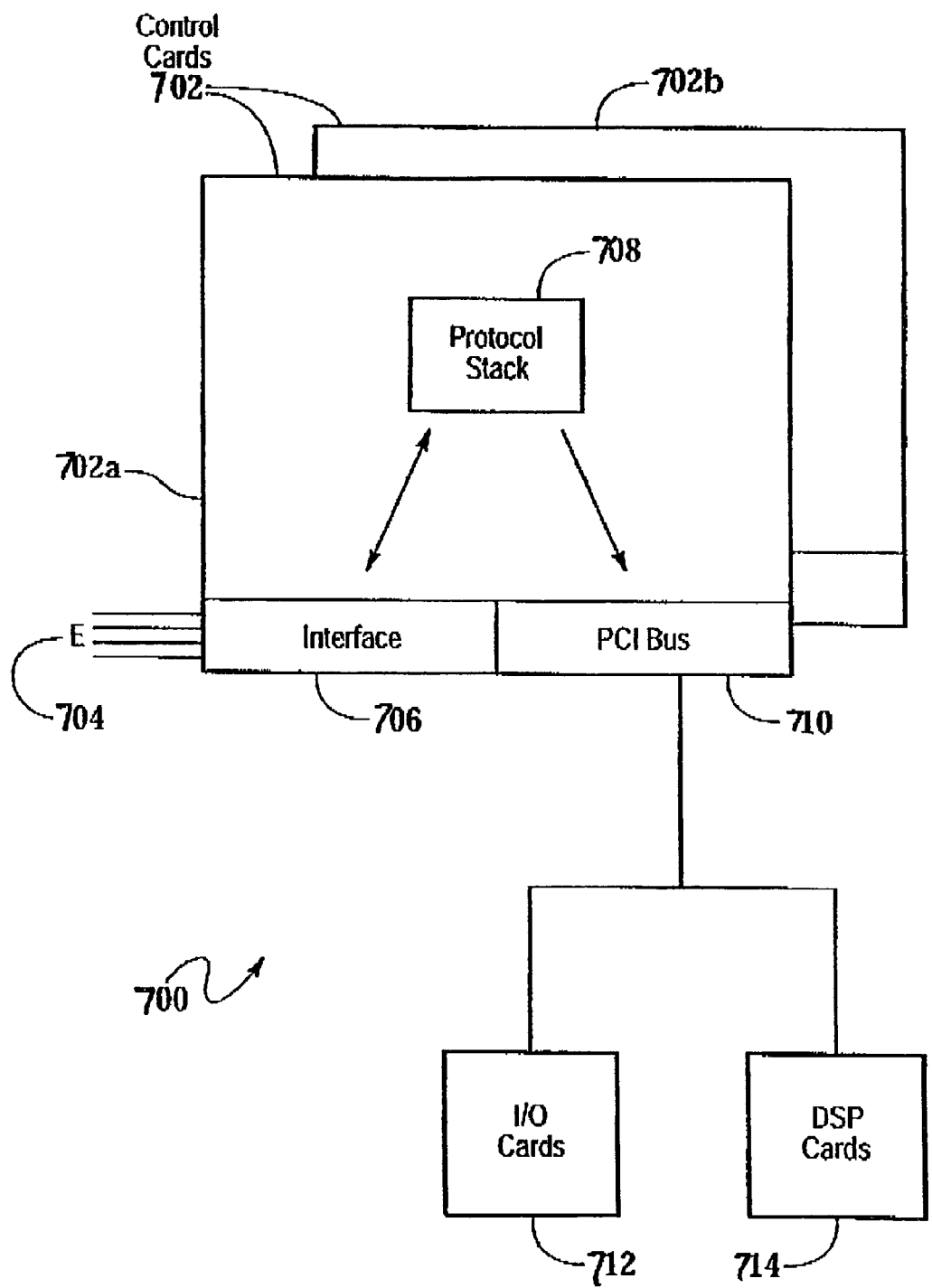
FIG. 7 is a schematic diagram illustrating a packet operating system in accordance with the present invention.

Turning now to FIG. 7, a schematic diagram illustrating a packet operating system 700 with redundant control cards 702a and 702b is shown. Control cards 702a and 702b are housed within a single chassis, such as switch 600 (FIG. 6). Messages 704 enter packet operating system 700 through interface 706 on control card 702a. Messages 704 travel from interface 706 onto protocol stack 708 and then to peripheral component interconnect ("PCI") bus 710. PCI bus 710 sends messages 704 to either input/output ("I/O") cards 712 or DSP cards 714. Control card 702b mirrors either a portion or all of the data of control card 702a. Each control card 702a and 702b of packet operating system 700 has its own memory and thus avoids the typical problems associated with shared memory, such as recursive calls and have synchronization and corruption problems.

Figure 8:
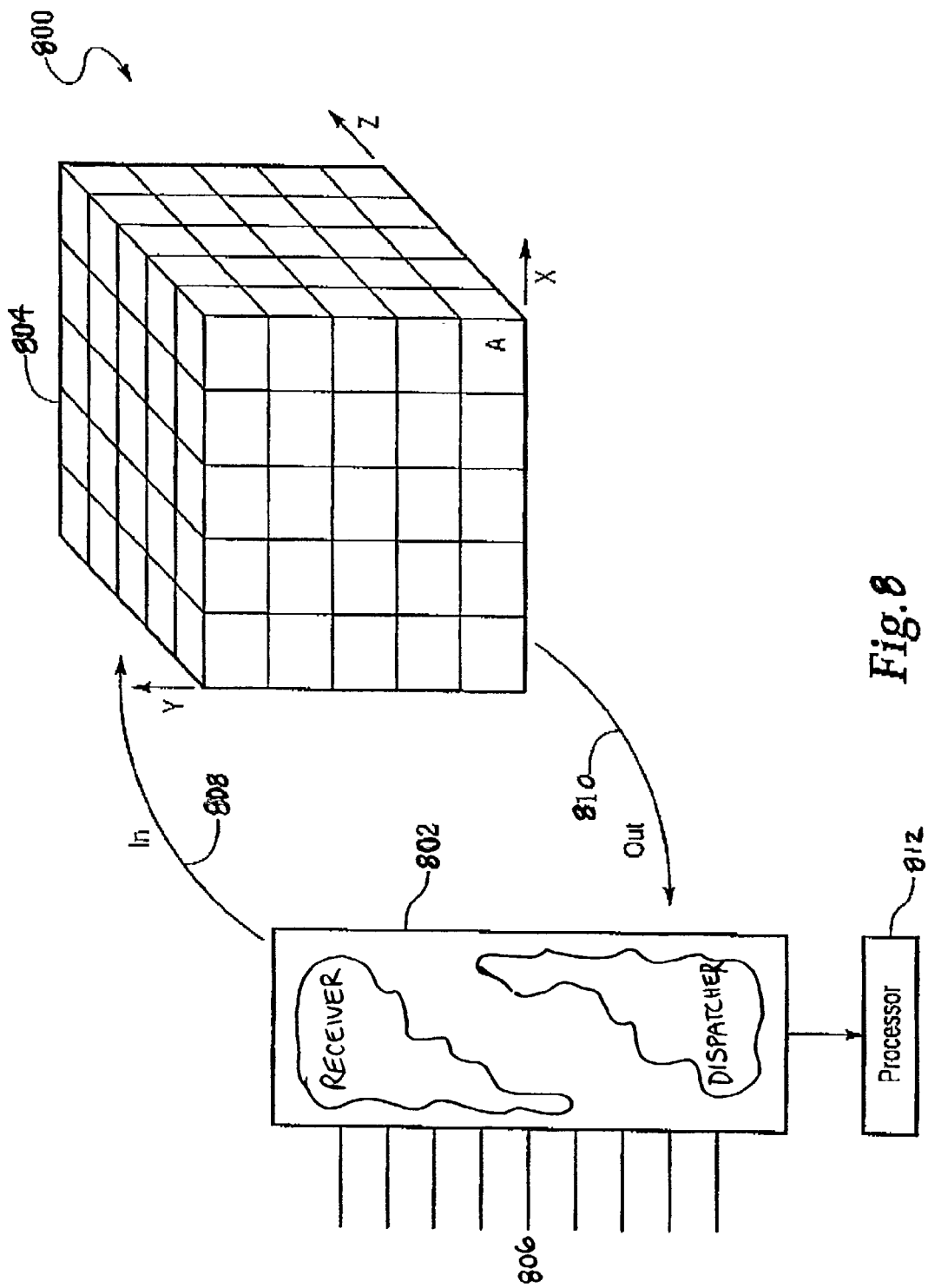
FIG. 8 is a schematic diagram illustrating a message scheduling system in accordance with the present invention.

FIG. 8 is a schematic diagram illustrating a message scheduling system 800 in accordance with the present invention. The scheduling system 800 of the present invention includes a scheduler 802 communicably coupled to a multidimensional queue 804. Scheduler 802 may comprise a receiver function and a dispatcher function. The multidimensional queue 804 may be described as a "set" of queues wherein the first square along the X-axis and Y-axis, such as square 804A, represents the head of a queue. Note that the multidimensional queue 804 is not limited to a three-dimensional queue as depicted in FIG. 8. Each queue within the multidimensional queue 804 is designated to receive messages based on a processing priority or criteria and an attribute associated with the message. The message attributes may include a virtual private network ("VPN") classification, a destination software function, functionality type or other attribute that distinguish one message from another, or combinations thereof. The processing priority can be based on QoS parameters or the type of message, such as data, fax, image, multimedia, voice, etc. VPN classification can be individual VPNs or groups of VPNs.

For example, one possible configuration of the multidimensional queue 804 could be based on VPN classification in the X-direction, processing priority in the Y-direction, and first-in-first-out ("FIFO") in the Z-direction. Moreover, each function can have a slot comprised of multiple dimensions. A fourth dimension can also be added to the multidimensional queue 804 by making it an array of three-dimensional queues, where each one is handled by one type of functionality. In order for the scheduler or dispatcher 802 of the multidimensional queue 804 to call the right functionality, a function index and a jump table can be used.

The multidimensional queue 804 can be characterized as an advanced queue structure that consists of multiple sub-queues bundled in a single receive queue wherein each sub-queue serves a set of messages 806. The messages 806 can be classified by their priority (first dimension) and message classification or service classes (second dimension). Priority sub-queues will be serviced according to one or more algorithms, such as an exponentially weighted round robin scheme. Within each priority there will be multiple sub-queues representing multiple VPN service classes. VPNs will be mapped into these service classes. Service classes themselves will have a weighting scheme among themselves so that different qualities of service can be provided. In this example, the multidimensional queue 804 is a two-dimensional queue, consisting of p*c monolithic sub-queues, where p is the number of message priorities and c is the number of VPN service classes. The multidimensional queue 804 itself is three-dimensional since the messages within each of the p*c sub-queues represent the third dimension (the depth of the sub-queues). The messages within each one-dimensional sub-queue are serviced in FIFO order.

The receiver function of scheduler 802 stores messages 806 in the multidimensional queue 804 (indicated by arrow 808) based on a processing priority or priority criteria and an attribute associated with the message 806. Note that multiple attributes may be used to determine where the message 806 is stored in the multidimensional queue 804. A special function can be used to insert the message 806 into the multidimensional queue 804. For example, this special function can use the function index, the VPN, the priority, and/or any other important criteria to insert the message 806 into the multidimensional queue 804. The dispatcher function of scheduler 802 pulls or schedules queued messages from the multidimensional queue 804 (indicated by arrow 810) for processing by the one or more processors 812 based on an algorithm. The algorithm may take into account operating criteria, such as historical operating data, current operating data, anti-starvation criteria, one or more of the message attributes as described above, or combinations thereof. For example, the algorithm may be an exponentially weighted, non-starving, nested-round-robin, message-priority-based scheme, or a weighted, non-starving, nested-round-robin, class-based scheme, or any combination thereof. Other suitable algorithms, depending upon the specific application, may be used in accordance with the present invention. The algorithm may also provide no more than a pre-determined number of consecutive messages to a function or processing entity within a time period. Once the scheduler 802 pulls or schedules a queued message, the scheduler 802 sends the message to the processor 812.

Now referring to FIG. 9, a flowchart illustrating a method 900 for scheduling one or more messages for processing in accordance with one embodiment of the present invention is shown. The process 900 begins in block 902 and one or more messages are received in block 904. Each message is stored in a multidimensional processing queue based on a processing priority and an attribute associated with the message in block 906. Thereafter, each queued message from the multidimensional processing queue is scheduled for processing based on an algorithm in block 908. The process 900 then repeats for each newly received message and until all messages are scheduled from the multidimensional queue. Note that this method 900 can be implemented as a computer program embodied on a computer readable medium wherein each block is performed by one or more code segments. Also note that it may be desirable to give system messages the highest priority (label lookups, etc.). Typically priority levels are set at compile time, while service levels are set by a network administrator.

In addition, the present invention provides a communications switch having one or more ingress cards, one or more signal processing cards, one or more control cards containing one or more processors and one or more egress cards. Each signal processing card contains an array of digital signal processors. The switch also includes a switch fabric communicably coupling the ingress cards, the signal processing cards, the control cards and the egress cards, a TDM bus communicably coupling the ingress cards, the signal processing cards, the control cards and the egress cards, a multidimensional processing queue, and a scheduler communicably coupled to each processor and the multidimensional processing queue. The scheduler receives one or more messages, stores each message in the multidimensional processing queue based on a priority and an attribute of the message, and schedules each queued message from the multidimensional processing queue for processing based on an algorithm.

The algorithm used by the present invention can be a single algorithm or multiple algorithms that are selectively used depending on various operating criteria. For example, an exponentially weighted, non-starving, nested-round-robin message-priority-based scheme could be used. Weighted means higher priority messages are served more frequently than the lower priority messages. There is an exponential service ratio between successive priority levels. Non-starving means lower priority messages will eventually get served. Round-robin means servicing mechanism moves from one priority-level to the other in a round-robin fashion. The nesting gives the exponential service weighting, e.g. assume that there are three message priorities: High, Medium and Low. Also assume that the queues have messages in them at any given time. Then, the order and amount of servicing would be H-M-H-L-H-M-H and repeating in the same order. So, four High messages, two Medium messages and one Low message would have been serviced. Also, after one high priority message is serviced, it will take at most one more lower priority message service before another high priority message is serviced. The following illustration may serve better to explain the order of servicing.

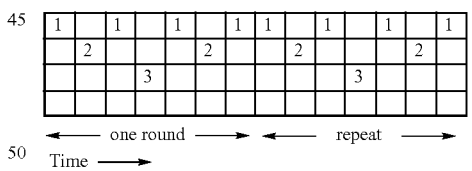

Another algorithm that can be used is a weighted, non-starving, round-robin, VPN class-based scheme. Within each priority, there are multiple classes of service. For each class there is a maximum number of messages that can be serviced before the next class is serviced. The maximum number of serviceable messages assigned to each class defines the relative priority among those classes.

The algorithm may also provide a maximum number of messages that can be serviced during each scheduling period. Regardless of priority or service class a function is not given more than a pre-determined number of consecutive messages to be serviced. When it reaches the maximum, the dispatcher starts dequeuing messages for another function.

A service example with four priority levels and three classes will now be described. Service ratios for priorities:

8-4-2-1, i.e. for every eight priority-one messages serviced the task will serve one priority-four message. However, it will do this in a round-robin fashion so that priorities are interleaved. For example, assume that there are enough messages at each priority level and these number represent the priority level of each successive message being dequeued: 1-2-1-3-1-2-1-4-1-2-1-3-1-2-1, and so on repeating the same sequence.

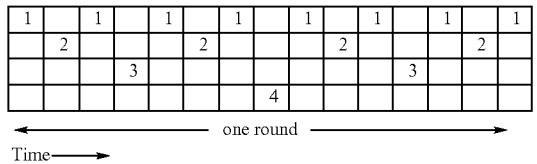

Time→

Service ratios for classes: 10-6-3, i.e. for every 10 class-one messages serviced, the task will service 6 class-two messages and 3 class-three messages. These ratios are kept on a per priority basis so as to avoid starvation and imbalance among different classes. Within each class the higher priority messages will be serviced more frequently than the lower priority messages based on the service ratios for priorities. The maximum messages to serve consecutively for this function are 15.

Assume the following queue status to start with. The rows represent different priorities and the columns represent different classes. Each cell represents the depth of the sub-queue. For example, there are three messages in the queue represented by priority four and class three. For simplicity of this illustration, assume that no new message is inserted into these queues during servicing.

|  | Class 1 | Class 2 | Class 3 |
|---|---|---|---|
| Priority 1 | 2 | 0 | 1 |
| Priority 2 | 3 | 5 | 2 |
| Priority 3 | 4 | 2 | 0 |
| Priority 4 | 0 | 1 | 3 |

If this queue was serviced for the first time, the message at the head of priority-one, class-one sub-queue would be dequeued. So, after the first iteration, the queue depths would look like this (the change is shown in bold):

|  | Class 1 | Class 2 | Class 3 |
|---|---|---|---|
| Priority 1 | 1 | 0 | 1 |
| Priority 2 | 3 | 5 | 2 |
| Priority 3 | 4 | 2 | 0 |
| Priority 4 | 0 | 1 | 3 |

The following table illustrates the dequeuing from the sub-queues at each iteration. The first column indicates the cell being serviced. The second column indicates the depth of the sub-queue after the service. The third column indicates the next message priority that needs to be serviced within this class. The fourth column indicates the next calls that needs to be serviced. The fifth column indicates remaining service quota for current class. Note that when remaining class quota reaches 0 or there are no more messages left in the current class, we move on to the next class. The seventh column indicates total number of messages that were served during this scheduling period. The first iteration would be:

| Service | Messages Left | Next Priority | Next Class | Quota Left | Highest Priority | Total Messages | Comments |
|---|---|---|---|---|---|---|---|
| P1-C1 | 1 | 2 | 1 | 9 | 1 | 1 |  |
| P2-C1 | 2 | 1 | 1 | 8 | 1 | 2 |  |
| P1-C1 | 0 | 3 | 1 | 7 | 2 | 3 |  |
| P3-C1 | 3 | 1 | 1 | 6 | 2 | 4 |  |
| P1-C1 | 0 | 2 | 1 | 6 | 2 | 4 | A |
| P2-C1 | 1 | 1 | 1 | 5 | 2 | 5 | B |
| P1-C1 | 0 | 4 | 1 | 5 | 2 | 5 | A |
| P4-C1 | 0 | 1 | 1 | 5 | 2 | 5 | A |
| P1-C1 | 0 | 2 | 1 | 5 | 2 | 5 | A |
| P2-C1 | 0 | 1 | 1 | 4 | 3 | 6 |  |
| P1-C1 | 0 | 3 | 1 | 4 | 3 | 6 | A |
| P3-C1 | 2 | 1 | 1 | 3 | 3 | 7 |  |
|  |  |  |  |  |  |  | C |
| P3-C1 | 1 | 1 | 1 | 2 | 3 | 8 |  |
|  |  |  |  |  |  |  | D |
| P3-C1 | 0 | 1 | 1 | 1 | 3 | 9 |  |
|  |  |  |  |  |  |  | E |
| P1-C2 | 0 | 2 | 2 | 6 | 2 | 9 | F |
| P2-C2 | 4 | 1 | 2 | 5 | 2 | 10 |  |
|  |  |  |  |  |  |  | G |
| P2-C2 | 3 | 1 | 2 | 4 | 2 | 11 |  |
| P3-C2 | 1 | 1 | 2 | 3 | 2 | 12 |  |
| P2-C2 | 2 | 1 | 2 | 2 | 2 | 13 |  |
| P4-C2 | 0 | 1 | 2 | 1 | 2 | 14 |  |
| P2-C2 | 1 | 1 | 3 | 0 | 2 | 15 | H |

Comments:
A: Bypassed (no message).
B: Priority bypassed 1, 4, 1 since there are no messages.
C: 1, 2, 1 cycle repeat 1, 2, 1 will be bypassed since there are no messages.
D: 1, 2, 1, 4, 1, 2, 1 will be bypassed since there are no messages.

-continued

| Service | Messages Left | Next Priority | Next Class | Quota Left | Highest Priority | Total Messages | Comments |
|---------|---------------|---------------|------------|------------|------------------|----------------|----------|

E: Indication that there are no more messages in this class, we reset class quota back to 10 and move on to the next class. Priority serviced for the next class in this case will be 1. For compactness, only the scheduled order is present in the remaining rows. The next priority still contains what would have been scheduled if there were messages. The priority in the row indicates the actual message that was selected.
F: No messages at this priority level.
G: Priority cycle repeats here.
H: Class quote exhausted, move onto next class, set quota back to 6. Function max reached. Move onto next function At this point the maximum number of messages that can be serviced consecutively have been exhausted. Here is how the queue depths look like after the first consecutive run:

|            | Class 1 | Class 2 | Class 3 |
|------------|---------|---------|---------|
| Priority 1 | 0       | 0       | 1       |
| Priority 2 | 0       | 1       | 2       |
| Priority 3 | 0       | 1       | 0       |
| Priority 4 | 0       | 0       | 3       |

The second iteration would be:

| Service | Messages Left | Next Priority | Next Class | Quota Left | Highest Priority | Total Messages | Comments |
|---------|---------------|---------------|------------|------------|------------------|----------------|----------|
| P1-C3   | 0             | 3             | 3          | 2          | 2                | 1              |          |
| P2-C3   | 1             | 1             | 3          | 1          | 2                | 2              | I        |
| P2-C3   | 0             | 1             | 1          | 3          | 2                | 3              | J        |
| C1      | 0             | −1            | 2          | 10         | −1               | 3              | K        |
| P3-C2   | 0             | 1             | 2          | 5          | 2                | 4              |          |
| P2-C2   | 0             | 1             | 2          | 4          | 2                | 5              |          |
| C2      | 0             | −1            | 3          | 6          | −1               | 5              | L        |
| P4-C3   | 2             | 4             | 3          | 2          | 4                | 6              |          |
| P4-C3   | 1             | 4             | 3          | 1          | 4                | 7              |          |
| P4-C3   | 0             | −1            | 1          | 3          | −1               | 8              | M        |

Comments:
I: Cycle repeats after this.
J: Class quota exhausted, move onto the next class, set quota back to 3.
K: No service, move onto next class.
L: Queues in this class depleted, move onto next class.
M: Queues in this class depleted, move onto next class. Quota for this class also depleted.

At this point there is no message left in any of the subqueues, so the dispatcher would move onto the next function's queue. The exponential weighted priority servicing mechanism is not reset back to priority-one because the next message to service may be the lowest priority message in that class. This ensures that there is no starvation of low priority messages if the process happens to move out of a class whenever the class quota is exhausted.

Although preferred embodiments of the present invention have been described in detail, it will be understood by those skilled in the art that various modifications can be made therein without departing from the spirit and scope of the invention as set forth in the appended claims.

What is claimed is:

1. A method for scheduling one or more messages comprising the steps of:
   receiving the one or more messages on a per packet basis;
   storing each message in a multidimensional processing queue based on a processing priority and an attribute associated with the message, wherein the processing priority comprises one or more parameters that are evaluated per packet to produce a priority for the packet; and
   scheduling each queued message from the multidimensional processing queue for processing based on an algorithm, wherein the algorithm is an exponentially weighted, non-starving, nested-round-robin, message-priority-based scheme.

2. A method for scheduling one or more messages comprising the steps of:
   receiving the one or more messages on a per packet basis;
   storing each message in a multidimensional processing queue based on a processing priority and an attribute associated with the message, wherein the processing priority comprises one or more parameters that are evaluated per packet to produce a priority for the packet; and
   scheduling each queued message from the multidimensional processing queue for processing based on an algorithm, wherein the algorithm is a weighted, non-starving, nested-round-robin, class-based scheme.

3. A computer program embodied on a computer readable medium loadable into a computer memory to be read and executed by a processor, comprising
   code segments adapted to schedule one or more messages on a per packet basis, further comprising:
   a code segment for receiving the one or more messages;

a code segment for storing each message in a multidimensional processing queue based on a processing priority and an attribute associated with the message wherein the processing priority comprises one or more parameters that are evaluated per packet to produce a priority for the packet, and further wherein the processing priority: and a code segment for scheduling each queued message from the multidimensional processing queue for processing based on an algorithm, wherein the algorithm is an exponentially weighted, non-starving, nested-round-robin, message-priority-based scheme.

4. A computer program embodied on a computer readable medium loadable into a computer memory to be read and executed by a processor, comprising code segments adapted to schedule one or more messages on a per packet basis, further comprising:

a code segment for receiving the one or more messages;

a code segment for storing each message in a multidimensional processing queue based on a processing priority and an attribute associated with the message wherein the processing priority comprises one or more parameters that are evaluated per packet to produce a priority for the packet, and further wherein the processing priority; and a code segment for scheduling each queued message from the multidimensional processing queue for processing based on an algorithm, wherein the algorithm is a weighted, non-starving, nested-round-robin, class-based scheme.

5. A communications switch comprising:

one or more ingress cards;

one or more signal processing cards, each signal processing card containing an array of digital signal processors;

one or more control cards containing one or more processors;

one or more egress cards;

a switch fabric communicably coupling the ingress cards, the signal processing cards, the control cards and the egress cards;

a TDM bus communicably coupling the ingress cards, the signal processing cards, the control cards and the egress cards;

a multidimensional processing queue;

a scheduler communicably coupled to each processor and the multidimensional processing queue, the scheduler receiving one or more messages on a per packet basis, storing each message in the multidimensional processing queue based on a priority and an attribute of the message wherein the processing priority comprises one or more parameters that are evaluated per packet to produce a priority for the packet; and scheduling each queued message from the multidimensional processing queue for processing based on an algorithm.

* * * * *